June 19, 1928.

V. V. LOOMIS

LEMON REAMER 1,674,475

Filed Jan. 12, 1926

INVENTOR
Virgil V. Loomis
by his attys.
Byrnes, Stebbins Parmelee

Patented June 19, 1928.

1,674,475

UNITED STATES PATENT OFFICE.

VIRGIL V. LOOMIS, OF PITTSBURGH, PENNSYLVANIA, ASSIGNOR TO UNITED STATES GLASS COMPANY, OF PITTSBURGH, PENNSYLVANIA, A CORPORATION OF PENNSYLVANIA.

LEMON REAMER.

Application filed January 12, 1926. Serial No. 80,726.

The present invention relates to a lemon reamer, and more especially to its combination with a cup-like vessel for retaining and preventing the expressed juice from spilling.

The term "lemon reamer" is used in the trade to describe devices having a conical serrated projection upon which the half of a lemon, orange, lime or similar fruit is turned and pressed so as to get the juice. Lemon reamers are sometimes called "lemon juicers" or even "lemon squeezers".

Figure 1:
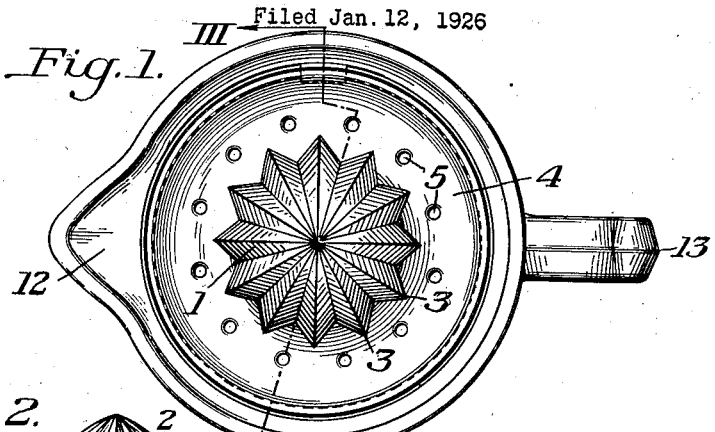
Figure 1 is a perspective view of the lemon reamer and its holding vessel.
Figure 2:
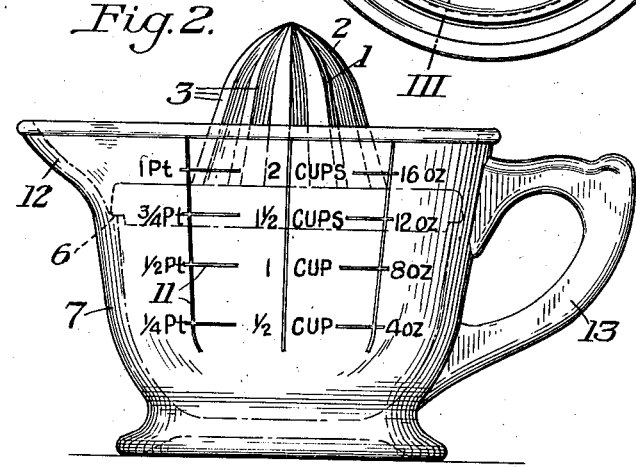
Figure 2 is an elevation of the same.
Figure 4:
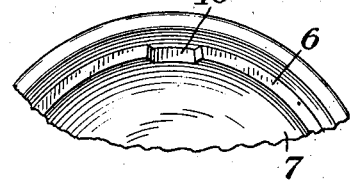
Figure 4 is a detail plan view showing the recess in the internal shoulder of the vessel.
Figure 3:
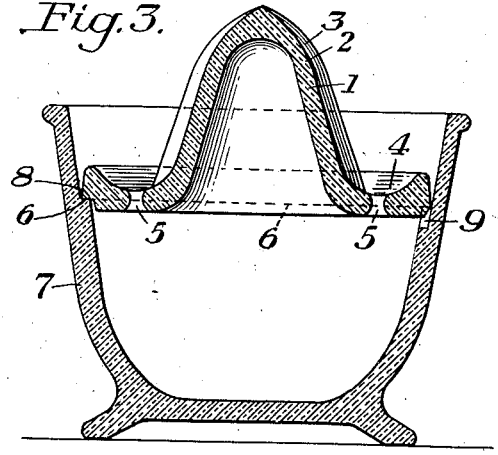
Figure 3 is a vertical section along the line III—III of Figure 1.
Figure 5:
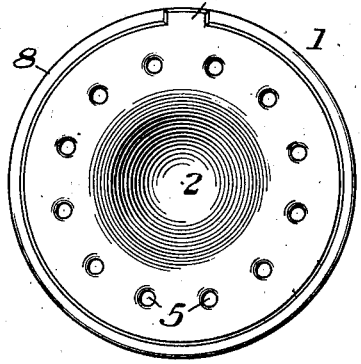
Figure 5 is a bottom plan view of the reamer removed from its holding vessel.

Referring to the illustrated embodiment of the invention, the lemon reamer proper 1 consists of the usual upwardly projecting cone 2 having the usual sharp ribs 3, so that when a lemon, orange, lime or other fruit is pressed down upon it and turned, the pulp will be macerated and the juice obtained. The conical central reaming portion is surrounded by a grooved base 4 having holes 5 through which the juice drips.

The lemon reamer is seated against an internal shoulder 6 of a cup-like vessel 7. A cooperating shoulder 8 is formed on the base of the reamer. The reamer is held from turning in its cup by means of a lug 9 formed on the bottom of the reamer base which engages a recess or cut away portion 10 in the shoulder 6.

The vessel 7 may be of any suitable form such as a cup or bowl. It is shown as a measuring cup having a measuring scale 11. This type of cup is very convenient as it not only may be used for measuring other things, but may also measure the lemon, orange, lime or other juices collected into it and has a spout 12 from which it may be conveniently poured.

The cup is also provided with the usual handle 13 by which it may be held while the lemons or other fruit are being pressed and turned against the reamer.

The vessel 7 forms a convenient reservoir for the lemon juice, thus obviating the necessity of emptying the juice after each lemon or half lemon is reamed which is the case with the usual lemon reamers. Also the cup extends a sufficient distance above the retaining shoulder 6 so that danger of the juice which is being pressed from the lemon spilling or spattering over the edge of the cup is obviated. The preferred material from which the reamer and its cup are made is glass, although other materials may be used.

The term "lemon reamer" is that used in the trade to designate devices for crushing the pulp and obtaining the juice from lemons, oranges, or other fruits which are pressed and turned against them and the term is therefore intended to include devices for getting the juice from fruits other than lemons.

While the preferred embodiment of the invention has been specifically illustrated and described, it is to be understood that the invention is not so limited, but may be otherwise embodied within the scope of the following claim.

I claim:

The combination with a circular cup-like vessel having a shoulder member providing a supporting seat portion, of a circular reamer member having a peripheral portion seated on the seat portion, one of said portions having a recess and the other of said portions having a projection adapted to interlock with said recess for preventing relative rotation between the members.

In testimony whereof I have hereunto set my hand.

VIRGIL V. LOOMIS.